(12) United States Patent
Li et al.

(10) Patent No.: US 9,103,961 B2
(45) Date of Patent: Aug. 11, 2015

(54) SYSTEMS AND METHODS FOR OPTICAL TRANSMISSION USING SUPERMODES (75) Inventors: Guifang Li, Oviedo, FL (US); Xia Cen, Orlando, FL (US); Neng Bai, Plainsboro, NJ (US)

(73) Assignee: University of Central Florida Research Foundation, Inc., Tampa, FL (US)

( * ) Notice: Subject to any disclaimer, the term of this patent is extended or adjusted under 35 U.S.C. 154(b) by 0 days.

(21) Appl. No.: 13/584,129

(22) Filed: Aug. 13, 2012

(65) Prior Publication Data

US 2013/0039627 A1 Feb. 14, 2013

Related U.S. Application Data

(60) Provisional application No. 61/522,970, filed on Aug. 12, 2011.

(51) Int. Cl.
*G02B 6/036* (2006.01)
*G02B 6/02* (2006.01)

(52) U.S. Cl.
CPC .................. *G02B 6/02042* (2013.01)

(58) Field of Classification Search
CPC .................................. G02B 6/02042
See application file for complete search history.

(56) References Cited

U.S. PATENT DOCUMENTS 6,826,343 B2 * 11/2004 Davis et al. ................. 385/126
2011/0188855 A1 * 8/2011 Kokubun et al. ............ 398/43

FOREIGN PATENT DOCUMENTS

WO    WO 2010038861 A1 *  4/2010

OTHER PUBLICATIONS

K. Imamura, K. Mukasa, and T. Yagi, "Investigation on multi-core fibers with large Aeff and low micro bending loss," in National Fiber Optic Engineers Conference (Optical society of America, 2010), p. OWK6.
K. Takenaga, S. Tanigawa, N. Guan, S. Matsuo, K. Saitoh, and M. Koshiba, "Reduction of crosstalk by quasi-homogeneous solid multi-core fiber," in National Fiber Optic Engineers Conference (Optical Society of America, 2010), p. OWK7.
B. Zhu, T. F. Taunay, M. F. Yan, J. M. Fini, M. Fishteyn, E. M. Monberg, and F. V. Dimarcello, "Seven-core multicore fiber transmissions for passive optical network," Optics Express 18, 11117-11122 (2010).
T. Hayashi, T. Taru, O. Shimakawa, T. Sasaki, and E. Sasaoka, "Ultra-low-crosstalk multi-core fiber feasible to ultra-long-haul transmission," in National Fiber Optic Engineers Conference (Optical Society of America, 2011), p. PDPC2.5.
P. Glas, M. Naumann, A. Schirrmacher, and T. Pertsch, "The multicore fiber-a novel design for a diode pumped fiber laser," Optics communications 151, 187-195 (1998).

(Continued)

*Primary Examiner* — Omar R Rojas
(74) *Attorney, Agent, or Firm* — Thomas | Horstemeyer, LLP (57) ABSTRACT

In some embodiments, coupled multi-core fiber is used for optical transmission. The coupled multi-core fiber includes multiple cores each supporting a spatial mode. The cores are positioned close enough to cause coupling between their modes that generates supermodes, that are used to transmit data.

20 Claims, 9 Drawing Sheets

(56) References Cited

OTHER PUBLICATIONS

P. K. Cheo, A. Liu, and G. G. King, "A high-brightness laser beam from a phase-locked multicore Yb-doped fiber laser array," Photonics Technology Letters 13, 439-441 (2001).

L. Li, A. Schulzgen, S. Chen, V. L. Temyanko, J. V. Moloney, and N. Peyghambarian, "Phase locking and in-phase supermode selection in monolithic multicore fiber lasers," Optics letters 31, 2577-2579 (2006).

* cited by examiner

SYSTEMS AND METHODS FOR OPTICAL TRANSMISSION USING SUPERMODES

CROSS-REFERENCE TO RELATED APPLICATION(S)

This application claims priority to U.S. Provisional Application Ser. No. 61/522,970, filed Aug. 12, 2011, which is hereby incorporated by reference herein in its entirety.

BACKGROUND

Capacity limits for single-mode fiber transmission has been a subject of research ever since it was recognized that the Kerr nonlinearity imposes a fundamental limit on fiber capacity. It is well known that the nonlinear coefficient is inversely proportional to the effective area in a single-mode fiber. Therefore, a simple and effective way to reduce the nonlinear penalty is to increase the fiber core diameter and thus enlarge the effective area. However, this approach is limited by increased macro-bending loss and/or dispersion.

Recently, a new method using "few-mode fibers" in single-mode operation was proposed to increase the core diameter without changing the loss and dispersion properties. Few-mode fibers (FMF) are optical fibers that support more than one spatial mode but fewer spatial modes than conventional multi-mode fibers. Although FMFs can carry more than one mode, the fundamental mode can be excited and transmitted without mode coupling over very long distances, as long as the effective indexes of the supported modes are sufficiently different from each other.

Space-division multiplexing (SDM) has also been proposed to increase fiber capacity. Fiber bundles are attractive for use in SDM because of their simplicity and compatibility. FMF is also a candidate for use in SDM because it supports a few large effective area modes and because mode coupling can be avoided if a large effective index difference ($\Delta N_{eff}$) exists among the modes. Unfortunately, there are some drawbacks associated with using FMFs for long-distance SDM. First, there is typically a large differential modal group delay (DMGD) among the modes of FMFs. Second, the modal loss of FMFs increases with mode order. Third, mode coupling is inevitable when using FMFs as the number of modes increases because large effective index differences are difficult to maintain for all modes.

Multi-core fiber (MCF) has further been proposed as a candidate for SDM due to its zero DMGD, equal loss, and ultra-low crosstalk between modes. However, the mode density of MCFs typically must be kept quite low in order to maintain low crosstalk. For example, the first MCF demonstrated for SDM transmission was painstakingly fabricated to reduce the crosstalk to a level of less than −30 dB/km. In more recent efforts, crosstalk has been reduced to the current record of −90 dB/km. In addition, each mode of an MCF still suffers a large nonlinear penalty because its effective area is the same as or smaller than that of an SMF.

As can be appreciated from the above discussion, it would be desirable to have a high-capacity optical transmission approach that avoids one or more of the above-described drawbacks.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The present disclosure may be better understood with reference to the following figures. Matching reference numerals designate corresponding parts throughout the figures, which are not necessarily drawn to scale.

FIGS. 6A-6C are graphs of $$\frac{dc}{d\omega}$$

with normalized frequency V=1.6, 1.7, and 1.9, respectively.

FIG. 6D is a graph of $$\frac{d}{d\lambda}\left(\frac{dc}{d\omega}\right)$$

with V=1.

DETAILED DESCRIPTION

As described above, fiber bundles, multi-core fibers (MCFs), and few-mode fibers (FMFs) suffer from drawbacks that make them less than ideal for high-capacity optical transmission. Disclosed herein, however, is an approach that avoids many of these drawbacks. That approach exploits mode coupling between the cores of a "coupled multi-core fiber" (CMCF) to generate supermodes that extend beyond the boundaries of the individual cores. Unlike conventional multi-core fiber, the core-to-core distance of CMCF is small to encourage such mode coupling. The closer spacing of the cores increases the mode density because the modes are supported by a fiber having a smaller cross-section. In addition, the closer spacing leads to a larger mode effective area than that of conventional MCF and FMF. Simulations have shown that the disclosed CMCF provides lower modal dependent loss, mode coupling, and differential modal group delay than FMFs. These results suggest that CMCF is a good candidate for both single-mode operation (SMO) and space-division multiplexing (SDM) operation.

In the following disclosure, various embodiments are described. It is to be understood that those embodiments are example implementations of the disclosed inventions and that alternative embodiments are possible. All such embodiments are intended to fall within the scope of this disclosure.

Theory

Figure 1:
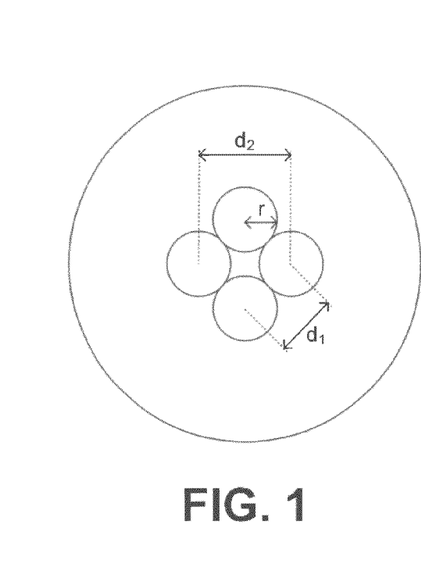
FIG. 1 is a schematic cross-sectional view of an embodiment of a coupled multi-core fiber.

The basic supermode analysis of CMCFs will now be discussed. A four-core CMCF, shown in FIG. 1, is selected as an example. The cores of the CMCF are assumed to be identical and each of them supports only one mode. The radius of the cores is r, and the distances between adjacent cores and non-adjacent cores are $d_1$ and $d_2$, respectively. The cores and the cladding that surrounds them have refractive indices of $n_1$ and $n_2$, respectively. The mode of each core has the same normalized frequency (V-number)

$$V = \frac{2\pi}{\lambda_0} r \sqrt{n_1^2 - n_2^2}.$$

According to coupled-mode analysis, the interaction between the modes of the four individual cores can be described by the following coupled-mode equation $$\frac{d}{dz}A = -j\overline{M}A, \quad \frac{d}{dz}A = -j\overline{M}A \quad (1)$$

where $A = [A_1 \ A_2 \ A_3 \ A_4]^T$, $$\overline{M} = \begin{pmatrix} \beta_0 & c_1 & c_2 & c_1 \\ c_1 & \beta_0 & c_1 & c_2 \\ c_2 & c_1 & \beta_0 & c_1 \\ c_1 & c_2 & c_1 & \beta_0 \end{pmatrix},$$

$A_i$ (i=1, 2, 3, 4) refers to the complex amplitude of the electrical field of the ith core, $\beta_0$ is the propagation constant of the single mode, and $c_1$ and $c_2$ are the coupling coefficients between adjacent and non-adjacent cores, respectively. Even though it has, for simplicity, been assumed that the cores have the same propagation constant, the physics described here also apply to cores with slightly different propagation constants. Coupling length as well as the coupling coefficient are frequently used to more directly describe the amount of coupling. Coupling length is defined as $\pi/2c$, where c is coupling coefficient. Since $\overline{M}$ is Hermitian for a lossless system, it can be diagonalized by a unitary matrix such that $$Q^{-1}\overline{M}Q = \Lambda, \ Q^{-1}\overline{M}Q = \Lambda \quad (2)$$

where $\Lambda$ is a diagonal matrix, $$\Lambda = \begin{pmatrix} \beta_1 & 0 & 0 & 0 \\ 0 & \beta_2 & 0 & 0 \\ 0 & 0 & \beta_3 & 0 \\ 0 & 0 & 0 & \beta_4 \end{pmatrix} \quad (3)$$

in which $\beta_m$ (m=1, 2, 3, 4) is the propagation constant of the mth supermode supported by the CMCF. The amplitude matrix for the supermodes is represented as $$B = Q^{-1}A \quad (4)$$

under which the coupled-mode Eq. (1) reduces to $$\frac{d}{dz}B = -j\Lambda B, \quad \frac{d}{dz}B = -j\Lambda B \quad (5)$$

Under the weakly guiding approximation, a general expression of the coupling coefficient $c_j$ (j=1, 2) is given as $$c_j = \sqrt{\frac{n_1^2 - n_2^2}{n_1^2}} \cdot \frac{1}{r} \cdot \frac{U^2}{V^3} \cdot \frac{K_0(Wd_j/r)}{K_1^2(W)} \quad (6)$$

where U and W can be found by solving equation $U \cdot K_0(W) \cdot J_1(U) = W \cdot K_1(W) \cdot J_0(U)$ and $U^2 + W^2 = V^2$. The J's and the K's are Bessel functions of the first kind and modified Bessel functions of the second kind, respectively. After obtaining the coupling coefficients $c_1$ and $c_2$, the supermodes can be solved as eigen-modes. The propagation constant of the supermodes are the eigenvalues, given by:

$$\beta_1 = \beta_0 + 2c_1 + c_2; \beta_2 = \beta_0 - c_2; \beta_3 = \beta_0 - c_2; \beta_4 = \beta_0 - 2c_1 + c_2. \quad (7)$$

When the coupling coefficients are small, the supermodes have similar propagation constants. These supermodes will couple to each other after propagation. SDM, in the form of mode-division multiplexing (MDM), using these supermodes has the advantage that the modal dispersion is small and therefore mode crosstalk can be efficiently computationally decoupled using multiple-input multiple-output (MIMO) equalization algorithms. A fiber that achieves a small coupling constant can be designed using Eq. (6). For the particular case of the four-core CMCF, the second and third supermodes are degenerate and have the same propagation constants. Mode-division multiplexing using these degenerate supermodes also has the advantage that mode crosstalk can be computationally efficiently de-coupled using multiple-input multiple-output equalization algorithms. Using $n_1 = 1.47$, $n_2 = 1.468$, $r = 7$ μm, $d = 14$ μm and $\lambda = 1.55$ μm, the field distributions of each supermode can be calculated. Those field distributions are shown in FIGS. 2A-2D.

Figure 2:
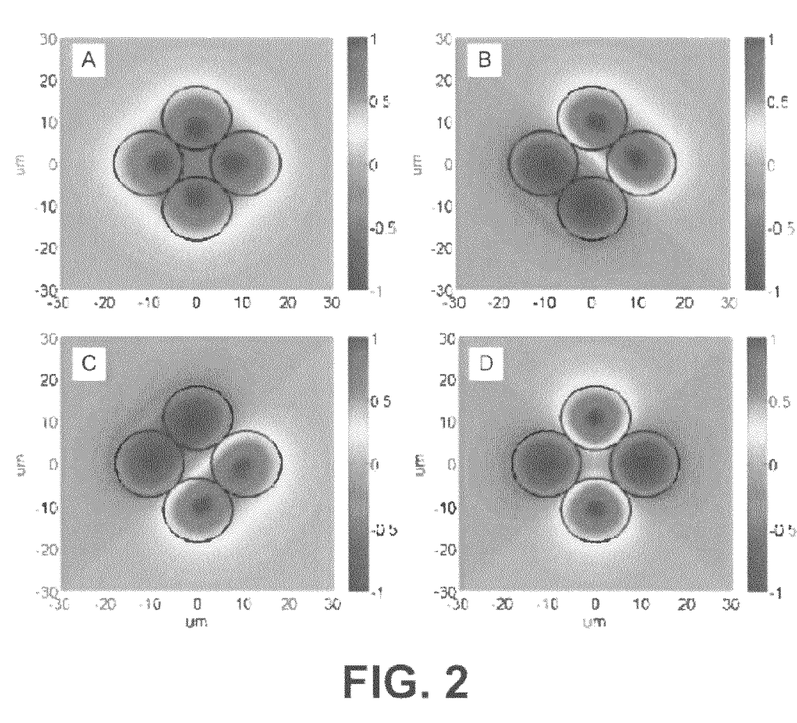
FIGS. 2A-2D are images of the field distributions of first, second, third, and fourth supermodes, respectively, for an example four-core coupled multi-core fiber.

One important characteristic of supermodes in four-core CMCFs is that they are superpositions of isolated modes with equal amplitude but not always the same phase. The fundamental supermode is shown in FIG. 2A and is the in-phase mode with the largest propagation constant. The higher-order supermodes have the field reversals between adjacent or non-adjacent core regions, as is shown in FIGS. 2B-D. This equal-amplitude characteristic gives similar confinement factors for the supermodes, leading to very small modal dependent loss. It is clear from this example that the properties of supermodes are determined not only by the parameters of each core but the pitch (i.e., distance) between cores. In other words, CMCFs have more degrees of freedom or large design space than MCFs and FMFs.

Fiber Design and Application

As identified above, CMCFs can be designed and applied to both SMO and MDM applications. For each case described below, a specific design of CMCF will be presented and compared to FMF in terms of transmission performance.

In order to achieve better performance, i.e., reduced nonlinear penalty, in the single-mode operation, the fundamental supermode should have a large effective area $A_{eff}$ given by $$A_{eff} = \frac{\left|\int_{-\infty}^{+\infty}\int_{-\infty}^{+\infty} I(x,y)dxdy\right|^2}{\int_{-\infty}^{+\infty}\int_{-\infty}^{+\infty} I^2(x,y)dxdy} \quad (8)$$

where $I(x, y)$ is the mode intensity distribution. To reduce or minimize supermode coupling and guarantee single-mode operation, the fundamental supermode should also have a large difference in effective index $\Delta N_{eff}$, which is given by $$\Delta N_{eff}(i,j) = \frac{1}{k_0}\cdot(\beta_i - \beta_j) = \frac{1}{k_0}\cdot\sum_n (a_n^i - a_n^j)\cdot c_n \quad (9)$$

where i and j represent the supermode number, $a_n^i$ and $a_n^j$ denote the coefficient of the coupling coefficient $c_n$ in the expression of β for the ith and jth supermode respectively (see Eq. (7) as an example).

Figure 3A:
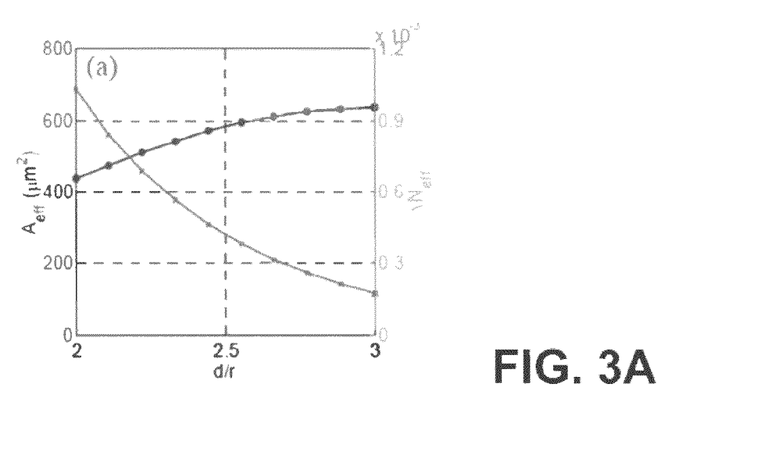
FIG. 3A is a graph of effective area $A_{eff}$ index difference $\Delta N_{eff}$ versus pitch-to-core ratio (d/r) for the fundamental mode of six-core coupled multi-core fiber.
Figure 3B:
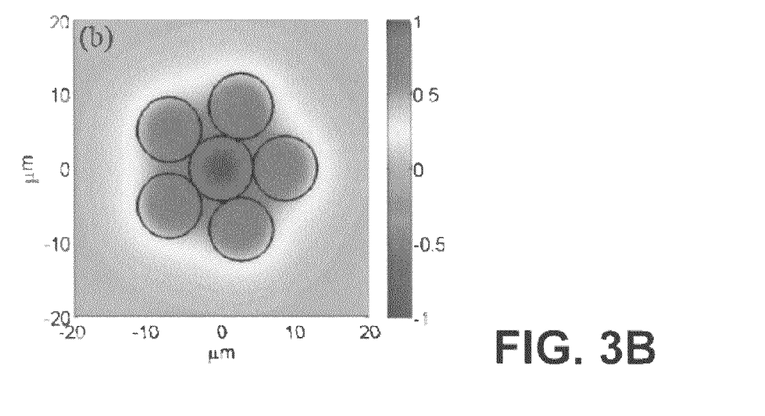
FIG. 3B. is an image of the field distribution of the fundamental mode of the six-core coupled multi-core fiber of FIG. 3A.

The number of modes and the bending loss of the large-area fundamental supermode are two of the most important fiber properties. For an example comparison between the CMCFs and FMFs, the macro-bending loss has been selected to be 0.0308 dB/m at a mandrel radius of 20 mm and the number of modes has been selected to be six for both types of fibers. The bending loss value is calculated using the curvature loss formula and its value is set in accordance with that for standard SMF fibers. Note that this value represents the minimum bending loss as other factors including micro-bending loss and the situation in which manufacture imperfections are not considered. Both the six-core CMCF and the six-mode FMF have two pairs of degenerate modes and two non-degenerate modes. The cores of the six-core CMCF are arranged to optimize $A_{eff}$ of the fundamental supermode. The fundamental supermode field distribution as well as the core arrangement is shown in FIG. 3B. For the purposes of this discussion, all designs are based on step-index profiles. As a result, the design variables include the index difference $\Delta N_{eff}$ and the core radius r for both CMCFs and FMFs, and an extra parameter, namely, the pitch-to-core ratio (d/r) for CMCFs in addition to the core arrangement.

Before presenting the detailed comparison, it is worthwhile to consider the relationship between the pitch-to-core ratio (d/r) and $\Delta N_{eff}$ in CMCFs. From Eq. (6) and (9), it can be appreciated that a reduced d/r value would increase the coupling coefficient c, and result in a large $\Delta N_{eff}$. FIG. 3A shows the dependence of $A_{eff}$ and $\Delta N_{eff}$ on d/r. As cores are moved closer, increased coupling between the cores induces a larger split of the effective indexes of supermodes. It is observed that $A_{eff}$ has a weak dependence on d/r while $\Delta N_{eff}$ changes sharply with d/r. Therefore the smallest value of d/r (d/r=2) is chosen for this comparison.

Figure 3C:
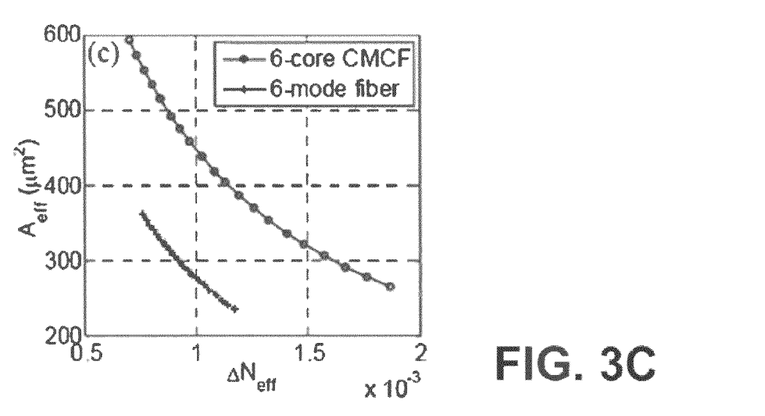
FIG. 3C is a graph of $A_{eff}$ versus $\Delta N_{eff}$ for a six-core coupled multi-core fiber and a six-mode few-mode fiber.

The fundamental mode properties for the six-core CMCFs and six-mode FMFs with the same macro-bending loss are identified in FIG. 3C. That figure reveals that CMCFs perform better in terms of both $A_{eff}$ and $\Delta N_{eff}$. An important reason for the larger $A_{eff}$ with CMCFs is that the fundamental supermode is the in-phase superpostition of the modes of six isolated cores. The larger $\Delta N_{eff}$ is mainly attributed to the optimization of the extra design freedom d/r. To provide a more comprehensive and detailed comparison, $\Delta N_{eff}$ is set at a sufficiently large value 1e-3 for both fibers while other important fiber parameters are listed in Table 1. The $A_{eff}$ of the CMCF is increased by 60% without compromising other properties. It is noted that slight different index differences ($\Delta N_{eff}$s) are applied to CMCFs and FMFs in order to maintain the same number of modes for both fibers.

TABLE 1

Properties of coupled multi-core fiber and few-mode fiber design for single-mode operation

| @1.55 μm | Step-index CMCF | Step-index FMF |
|---|---|---|
| Mode number | 6 | 6 |
| Index difference | 0.34% | 0.23% |
| Core area (μm²) | 357 | 357 |
| Confinement factor | 95.8% | 95.2% |
| $\Delta N_{eff}$ | 1e-3 | 1e-3 |
| $A_{eff}$ (μm²) | 438 | 274 |
| Bending loss 20 mm φ (dB/m) | 0.0308 | 0.0308 |
| Dispersion (ps/nm/km) | 19.2 | 22.7 |
| Dispersion slope (ps/nm²/km) | 0.077 | 0.064 |

It is expected that SDM optical transmission can operate successfully either without supermode coupling or with supermode coupling but with negligible or small differential modal group delay (DMGD). For the case in which there is no mode coupling, modes propagate independently and therefore can be separately detected. For the case in which there is mode coupling but small DMGD, modes may couple to each other but they can be detected together and then separated by using MIMO based digital signal processing (DSP) techniques. These two methods can be combined in supermode multiplexing as will be explained below.

Figure 4:
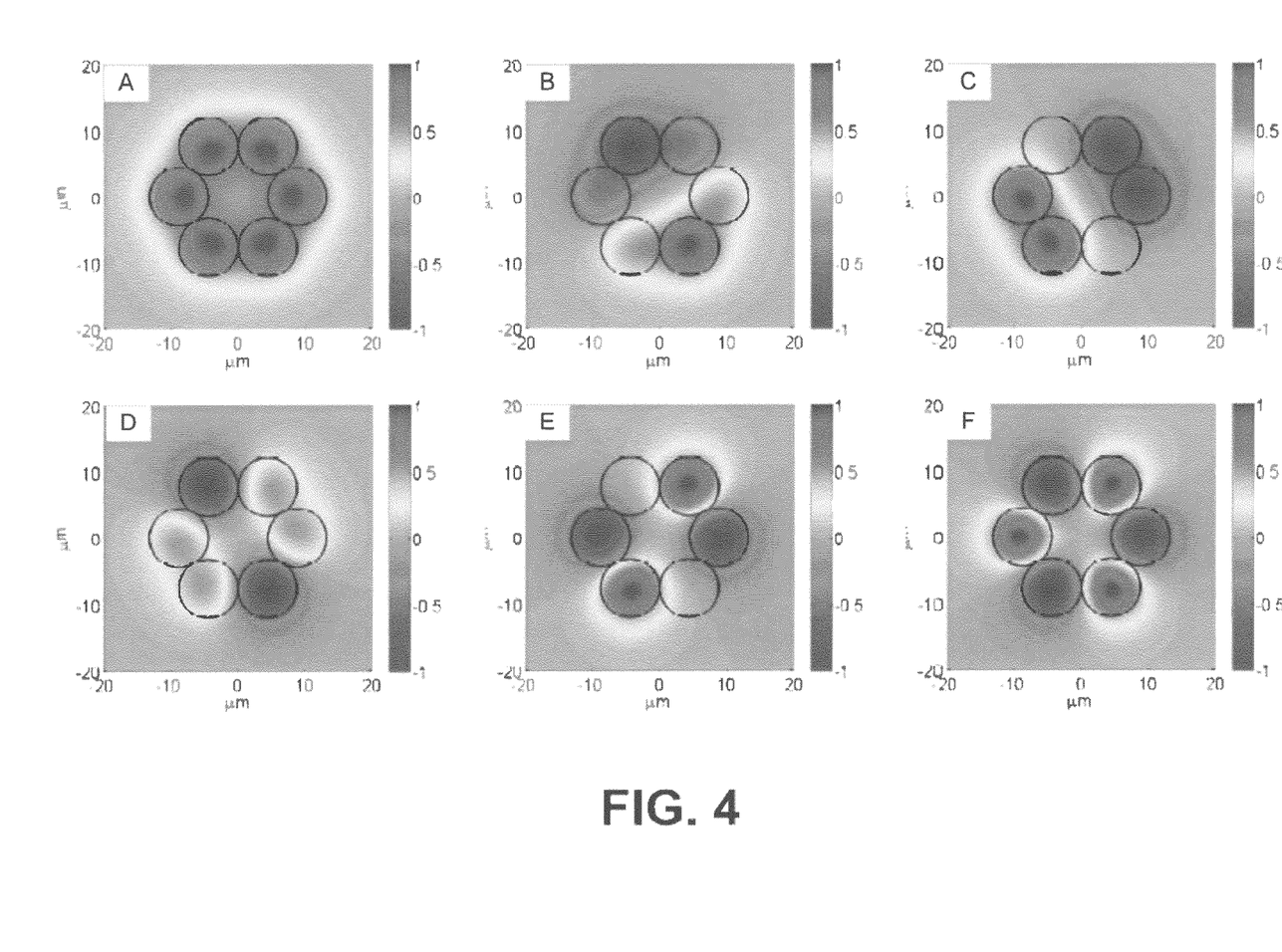
FIGS. 4A-4F are images of the field distributions of the first, second, third, fourth, fifth, and sixth supermodes for another example six-core coupled multi-core fiber.

In the next simulation, the number of modes is again selected to be six. However, the core arrangement is without a center core so that the higher order supermodes and the fundamental supermode are more symmetrical. The field distributions of the supermodes are shown in FIG. 4. Again, both six-core CMCFs and six-mode FMFs support six modes including two pair of degenerate modes and two other non-degenerate modes. For the six-mode FMFs, the two pairs of degenerate modes are the degenerate $LP_{11}$ and $LP_{21}$ modes. For the CMCFs, the two pairs of degenerate modes are the second and third, fourth, and fifth supermodes. The degenerate supermodes have identical effective indexes and thus there is no DMGD between them. The non-degenerate supermodes have different effective indexes. Fortunately, these non-degenerate supermodes/supermode groups can be designed to have low crosstalk by maintaining a large $\Delta N_{eff}$ between them. Therefore demultiplexing in SDM using CMCFs can be successfully performed in two steps: (i) the non-degenerate supermodes/supermode groups are separately detected while the degenerate supermodes are still mixed together, and (ii) mixed signals in the degenerate supermodes are recovered by the MIMO-based DSP techniques.

Figure 5A:
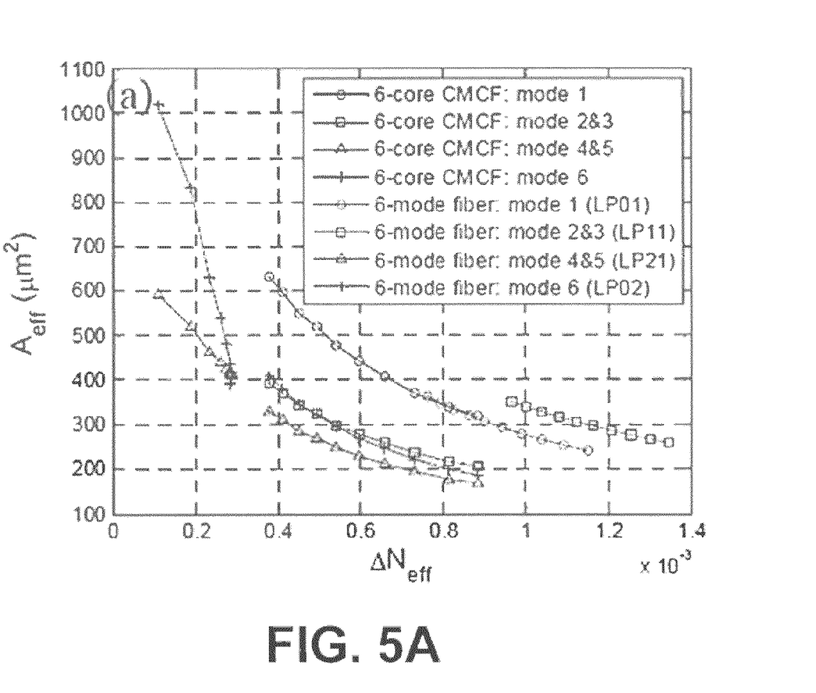
FIG. 5A is a graph of $A_{eff}$ versus $\Delta N_{eff}$ for a six-core coupled multi-core fibers and a six-mode few-mode fiber.
Figure 5B:
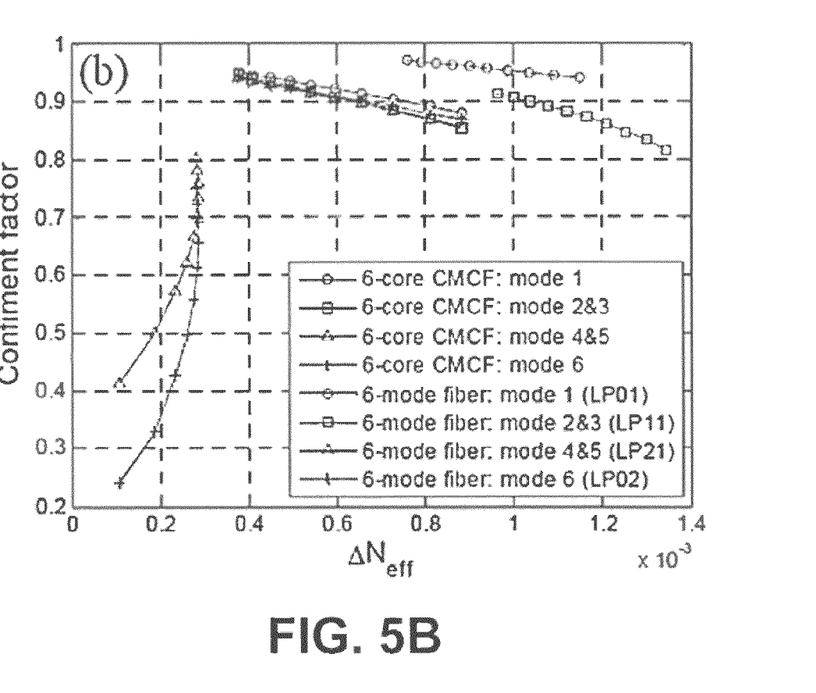
FIG. 5B is a graph of confinement factor versus $\Delta N_{eff}$ for the six-core coupled multi-core fiber and six-mode few-mode fiber.

There are three design parameters that can be used to optimize the performance for SDM: (1) $\Delta N_{\mathit{eff}}$ between any two modes should be sufficiently large to avoid mode coupling, (2) mode losses should be similar to each other and as low as possible, and (3) large effective areas are always required for reducing nonlinearity. Based on these parameters, six-core CMCFs and six-mode FMFs are designed respectively and their performances are shown in FIGS. 5A and B. The macro-bending losses of the fundamental modes for both fibers are fixed at 0.0308 dB/m at a mandrel radius of 20 mm. A confinement factor is used here to characterize the mode loss. A higher confinement factor implies lower loss as it indicates less bending loss. From FIGS. 5A and B, it can be appreciated that CMCFs show a significant advantage of attaining large $\Delta N_{\mathit{eff}}$, confinement, and $A_{\mathit{eff}}$ for all supermodes. In other words, the supermodes tend to preserve less mode coupling, lower loss, and lower nonlinearity than regular modes. All supermodes have similar properties (including mode coupling, loss, and nonlinearity), which is important for long-distance mode-division multiplexing. Higher-order modes in FMF appear to have larger effective areas in FIG. 5A, but these large effective areas actually result from low confinement (as indicated in FIG. 5B) and hence have no practical benefit.

A CMCF design with zero or small DMGD between supermodes has also been evaluated. In this case, even though supermode coupling may still exist, signal travel along the supermodes is at the same/similar group velocities. Therefore, the supermodes could be detected together and demultiplexing can be performed using MIMO DSP techniques as mentioned above. According to Eq. (6), DMGD between the ith and jth supermodes, can be represented as $$DMGD(i, j) = \frac{d\beta_i}{d\omega} - \frac{d\beta_j}{d\omega} = \sum_{n=1}^{2}(a_n^i - a_n^j) \cdot \frac{dc_n}{d\omega} \quad (10)$$

where $a_n^i$ and $a_n^j$ the supermode propagation constant $\beta$ for the ith and jth supermode, respectively, to the coupling coefficients $c_n$ as given in Eq. (7). Using Eq. (6), $$\frac{dc_n}{d\omega}(n = 1, 2)$$

is obtained as, $$\frac{dc_n}{d\omega} = \frac{1}{r} \cdot \left\{ \frac{\partial}{\partial \omega} \sqrt{1 - \frac{n_2^2(\omega)}{n_1^2(\omega)}} \cdot \left[ \frac{U^2}{V^3} \cdot \frac{K_0(Wd_n/r)}{K_1^2(W)} \right] + \right. \quad (11)$$

$$\left. \sqrt{1 - \frac{n_2^2}{n_1^2}} \cdot \frac{\partial}{\partial \omega} \left[ \frac{U(\omega)^2}{V(\omega)^3} \cdot \frac{K_0(W(\omega) \cdot d_n/r)}{K_1^2(W(\omega))} \right] \right\}$$

Figure 7:
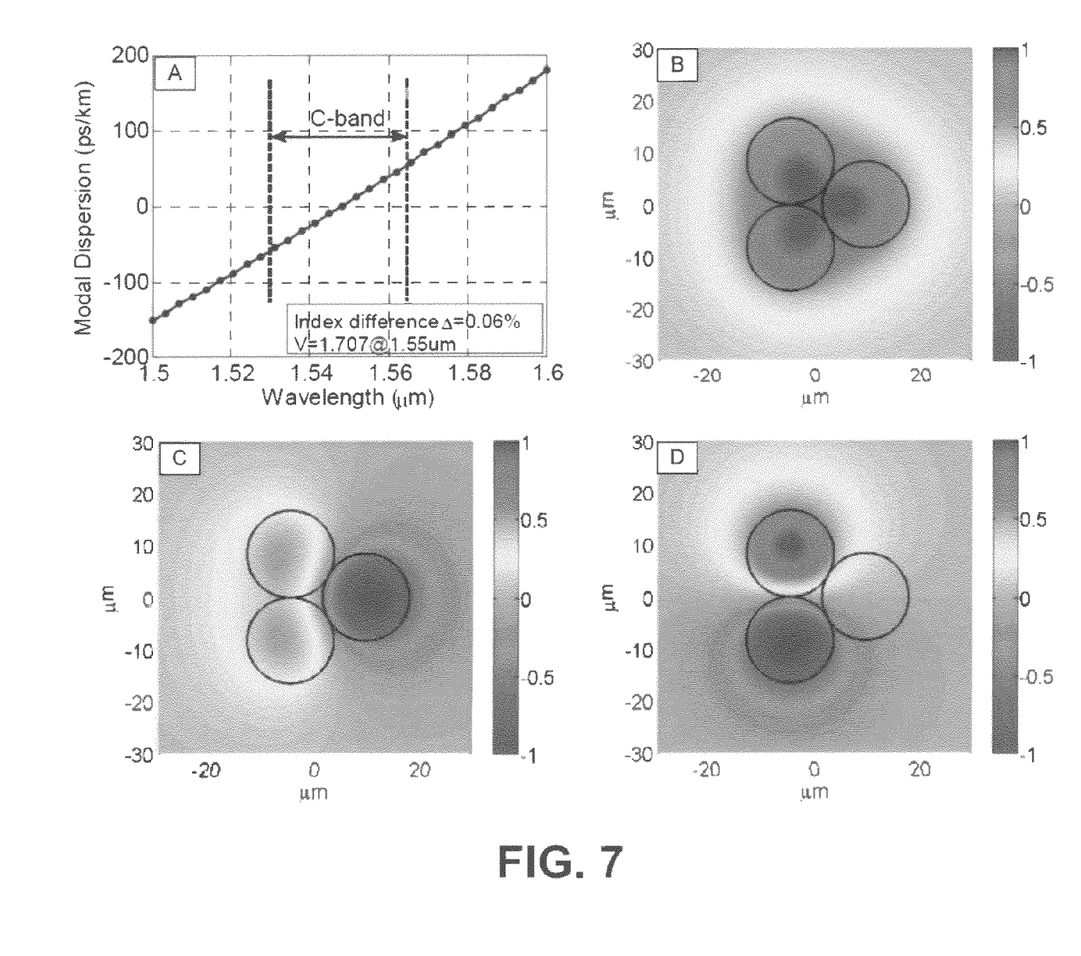
FIG. 7A is a graph of maximum differential modal group delay (DMGD) versus wavelength at V=1.707 at 1.55 μm and $\Delta N_{eff}$=0.06%.
FIGS. 7B-7D are images of the field distribution of the first, second, and third supermodes, respectively, of a three-core coupled multi-core fiber.

It should be noted that Eq. (10) is presented for four-core CMCFs, in which DMGD is a linear combination of $$\frac{dc_1}{d\omega} \text{ and } \frac{dc_2}{d\omega}$$

with different weighting coefficients for different supermodes. It is clear that, in order to achieve zero DMGD among all the supermodes, both $$\frac{dc_1}{d\omega} \text{ and } \frac{dc_2}{d\omega}$$

should vanish, which is unlikely if not impossible to realize in a simple step-index profile CMCF. This problem also exists for other CMCF structures where the number of cores is more than three. Therefore, three-core CMCFs are chosen here for zero DMGD design as they only contain adjacent core coupling, i.e., only one value of c exists. As a result, total DMGD scales with $$\frac{dc_1}{d\omega}$$

and it is equivalent to attain zero for $$\frac{dc_1}{d\omega}$$

in order to achieve zero DMGD in this structure. The mode fields of three-core CMCFs are given in FIGS. 7B, C, and D. As shown in Eq. (11), $$\frac{dc}{d\omega}$$

comprises two parts: a frequency dependent index ($n_1$, $n_2$) component and a frequency dependent waveguide parameters (V, U, W) component, i.e., the material and waveguide DMGD. At first glance, one might believe that material DMGD is larger than waveguide DMGD (material dispersion is dominant in chromatic dispersion of standard SMFs). However, it is incorrect to draw an analogy between DMGD and chromatic dispersion because the nature of DMGD is differential group delay (DGD) between modes instead of dispersion within one mode. The fact that all supermodes propagate in the same material but with different propagation constants implies that the material DMGD should be negligible compared to waveguide DMGD. This conclusion has been verified by simulation. Since material DMGD is significantly smaller than waveguide DMGD, they will be neglected in the following discussion to simplify the analysis.

As indicated in Eq. (11), $$\frac{dc}{d\omega}$$

is determined by the pitch-to-core ratio (d/r), V-number, and core radius r (or equivalently, V-number and index difference $\Delta N_{\mathit{eff}}$ since $$V = \frac{2\pi}{\lambda_0} r \sqrt{n_1^2 - n_2^2}.$$

Figure 6:
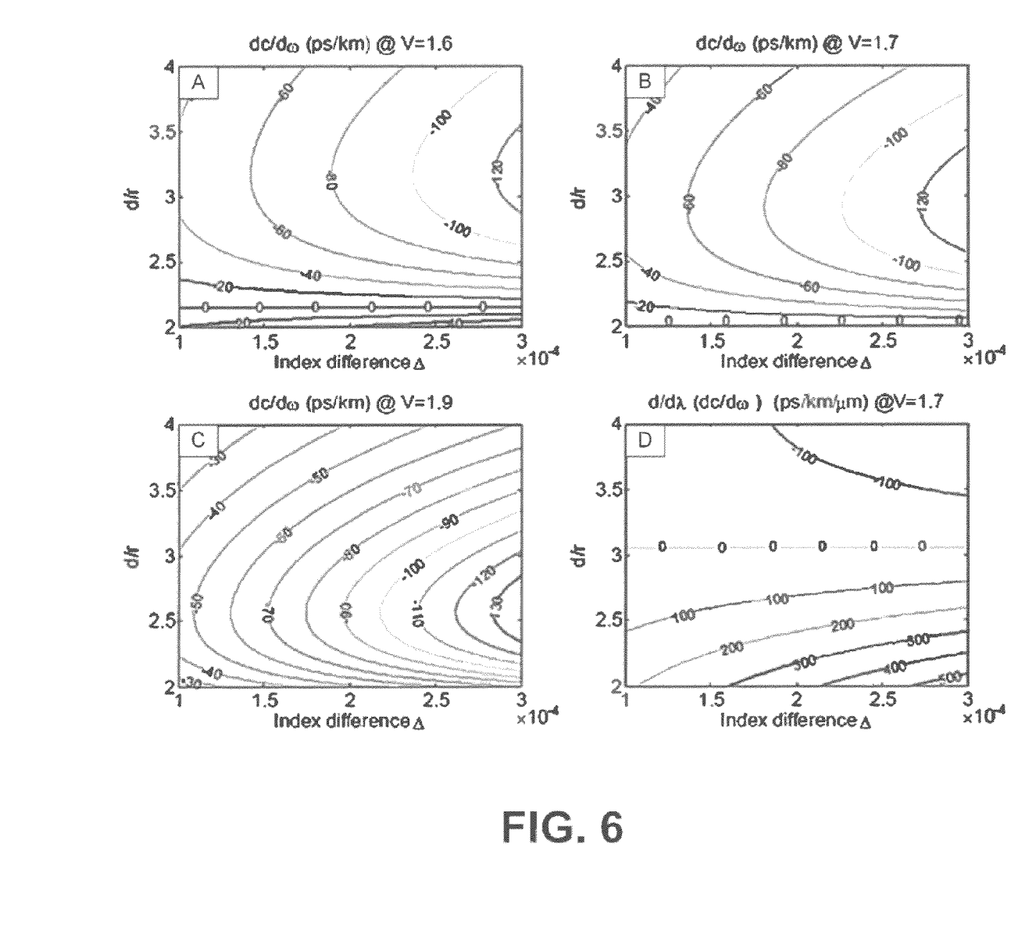

The relationship between those variables is shown in FIGS. 6A, B, and C. It is confirmed by both analysis and simulation that when the V-number is fixed, zero DMGD is attained if and only if d/r reaches a certain value. As the V-number increases, zero DMGD is realized for a smaller value of d/r, as indicated in FIGS. 6A, B, and C. Therefore, in order to attain zero DMGD, the V-number is limited to below 1.71 because d/r cannot less than 2. This is demonstrated by the zero DMGD horizontal lines and their locations with different V-numbers in FIGS. 6A, B, and C (in FIG. 6C, with V-number>1.71, the zero DMGD line does not exist). Apart from zero DMGD, a sufficiently small DMGD is enough for practical use as well. This can be obtained by reducing index difference $\Delta N_{\mathit{eff}}$.

To meet the practical application requirements in a wavelength-division multiplexing (WDM) system, CMCFs further require small DMGD variation within a certain range of wavelength, i.e., a small modal differential group delay slope (DMGDS). DMGDS can be considered to be linear within a narrow range of wavelength. Similar to DMGD, DMGDS between the ith and jth supermodes in a three-core structure can be represented as $$DMGDS(i,j) \frac{d}{d\lambda}\left(\frac{d\beta_i}{d\omega} - \frac{d\beta_j}{d\omega}\right) = (a_{1i} - a_{1j}) \cdot \frac{d}{d\lambda}\left(\frac{dc_1}{d\omega}\right) \quad (12)$$

Given that material DMGD is negligible, the $$\frac{d}{d\lambda}\left(\frac{dc}{d\omega}\right)$$

term can be further expressed as $$\frac{d}{d\lambda}\left(\frac{dC}{d\omega}\right) = \frac{1}{r} \cdot \sqrt{1 - \frac{n_2^2}{n_1^2}} \cdot \frac{\partial^2}{\partial\lambda \cdot \partial\omega}\left[\frac{U(\omega)^2}{V(\omega)^3} \cdot \frac{K_0(W(\omega) \cdot d/r)}{K_1^2(W(\omega))}\right] \quad (13)$$

DMGDS is plotted vs. d/r and $\Delta N_{\mathit{eff}}$ in FIG. 6(d). Even though zero DMGDS can be realized, they occur at a larger value of d/r with respect to zero DMGD. Therefore, it is difficult to achieve zero DMGD and DMGDS simultaneously. Even so, DMGDS can still be reduced by decreasing index difference $\Delta N_{\mathit{eff}}$. Wavelength-dependent DMGD as well as mode fields of a specific three-core CMCF design is provided in FIGS. 7A and B. The DMGD is below 60 ps/km over the entire C band, which is the same value achieved by three-mode fiber using a depressed cladding index profile.

Discussion

The possible candidates of next generation transmission fibers, especially for the application of SDM, will next be discussed. These fibers include MCF, FMF, fiber bundle and the disclosed CMCF. It is noted that, even though fiber bundle is usually referred as a bundle of SMFs, a bundle could be a bundle of MCFs, FMFs, or CMCFs. In other words, the fiber bundle is only a concept of package form, not a type of fiber. Therefore, only MCF, FMF, and CMCF are compared with each other as shown in Table 2.

TABLE 2

Comparison of next generation transmission fibers for spatial division multiplexing

| | | Multi-core fiber (MCF) | Coupled multi-core fiber (CMCF) | Few-mode fiber (FMF) |
|---|---|---|---|---|
| Transmission property | Spatial Mode Density[a] | Low | High | High |
| | Differential Modal Group Delay (DMGD) | Zero | Small (controllable) | Large |
| | Crosstalk[b] | Low | Easy to Control | Hard to Control |
| | Modal Dependent Loss | Equal | Similar | Different |
| | Loss | Low | Low | High (higher order modes) |
| | Effective Area $(A_{\mathit{eff}})$[c] | Small | Large | Large |
| Amplification | Pump coupling | Hard | Easy | Easy |
| | Power efficiency (cladding pump) | Low | High | High |
| | Scalability | Good | Good | Bad |
| | Inter-connect | Hard | Hard | Easy |

[a]Number of spatial modes per unit area of the fiber cross-section.
[b]Crosstalk between spatial modes (single modes for MCF; supermodes for CMCF; regular modes for FMF).
[c]Effective area of spatial modes.

The transmission property is a critical property because it determines the fundamental capacity of the fiber. For SDM transmission, the capacity of the system scales with the number of modes and hence is proportional to the spatial mode density. As identified above, the spatial mode density of MCFs is much lower than CMCFs and FMFs because of the low crosstalk requirement. Linear crosstalk caused by mode coupling is one of the most critical impairments in both CMCF and FMF systems. In order to facilitate spatial demultiplexing and linear crosstalk cancelation, increasing $\Delta N_{\mathit{eff}}$ to reduce mode coupling or equalizing DMGD to lessen computation load of the MIMO process should be considered in fiber design. As has been established above, CMCFs have more degrees of design freedom, namely, pitch length and core arrangement, and thus improve both $\Delta N_{\mathit{eff}}$ and DMGD significantly. Low and equal modal loss is another advantage of CMCFs over FMFs. Similar to MCFs, light is well confined within each core of CMCFs. The confinement factors of all supermodes are relatively high and similar. In contrast, high-order modes in FMFs have much larger bending loss than the fundamental mode indicated by low confinement factors. In addition, CMCFs can have larger $A_{\mathit{eff}}$ spatial mode than MCFs. Therefore, nonlinear impact is directly reduced which leads to higher fundamental capacity of the systems.

For long-haul SDM transmission, a low noise and power efficient amplifier is desirable. The design of the fiber amplifier should be matched with the type of transmission fiber. In the second part of Table 2, the complexity and performance of amplification are compared among the three candidate fibers. To reduce amplified stimulated emission noise, most doped ions must be inverted, which requires a pump power scaled with the effective guiding area of the pump. For the case of a cladding pump, a strong pump is guided in the inner cladding of the active fiber. With closer spacing between cores, a CMCF amplifier (CMCFA) is expected to have much smaller inner cladding size as compared to that of an MCF amplifier (MCFA). Consequently, the operating pump power can be dramatically reduced. In order to increase power efficiency for MCFAs, the pump may need to be launched core-by-core using free-space optics. However, the launching scheme requires further alignment complexity.

Another unique property of CMCFs and MCFs is that the number of spatial modes is the same as the core number of the fiber. Any number of spatial modes can be obtained by adjusting the core number. In contrast, for FMFs, tuning either core size or index difference cannot always guarantee the desired number of modes. Achieving the desired number of modes becomes more problematic as the number of modes increases. For example, FMFs can never support four modes including degenerate modes.

Example Embodiments

FIGS. 8A-F illustrate multiple embodiments of CMCFs 10. In each embodiment, the CMCF 10 includes at least two cores 14 that are surrounded by a cladding 16. More particularly, the embodiment of FIG. 8A comprises two cores 14, the embodiment of FIG. 8B comprises three cores 14, the embodiment of FIG. 8C comprises four cores 14, the embodiment of FIG. 8D comprises five cores 14, the embodiment of FIG. 8E comprises six cores 14, and the embodiment of FIG. 8F comprises seven cores 14. As can be appreciated from the figures, the cores 14 can be arranged in various layouts. For example, the center of the CMCF 10 can include a core 14, as in the embodiment of FIG. 8F, or can omit a core, as in the embodiment FIG. 8E. The former arrangement may be more useful in single mode operation while the latter may be more useful in supermode multiplexing.

In some embodiments, one or more of the cores 14 is a single mode core that only supports a single spatial mode. In such a case, the core 14 and can have a diameter of approximately 8 to 10 μm. In other embodiments, one or more of the cores 14 is a multi-mode core, such as a few-mode core, that supports multiple spatial modes. In such a case, the core 14 can have a diameter of approximately 10 to 50 μm. In other embodiments (not shown), the cladding can have photonic crystal structures so that fiber modes are guided by the photonic bandgap of the photonic crystal cladding. In this case, the core can be hollow or solid.

As is further shown in each of FIGS. 8A-F, the cores 14 are positioned in close proximity within the cladding 16 so as to encourage coupling of their modes. In some embodiments, the cores 14 nearly or actually touch each other. In that case, the pitch-to-core ratio d/r is approximately 2. In other embodiments, the cores 14 can be spaced a greater distance from each other. That distance depends upon the degree of mode coupling that is desired, which is also dependent upon the index difference $\Delta N_{eff}$. In general, mode coupling decreases as the core separation increases, and increases as the index difference decreases. For a typical step-index fiber in which the index difference is approximately 0.4%, the pitch-to-core ratio can, for example, be approximately 2 to 10.

The degree of mode coupling enabled by the CMCF configuration can be quantified in several ways, including the mode coupling length, the mode coupling coefficient, and the crosstalk that exists between the modes. In some embodiments, the CMCF has a mode coupling length less than 7 km, a coupling coefficient c larger than 0.2 $km^{-1}$, and a crosstalk larger than −30 dB/km.

Each core 14 has a refractive index that is greater than that of the cladding 16. It is noted, however, that the index of refraction can vary within each core 14. For example, the cores 14 can be step index or gradient index cores, if desired. While the cores 14 have the same propagation constant, they do not need to always have the same index profile. In fact, they can have different index profile and radius as long as $c.c > \Delta N_{eff}$.

Figure 8A:
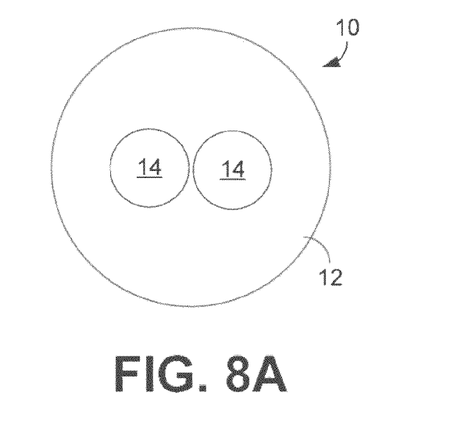
FIGS. 8A-8I are schematic cross-sectional views of multiple alternative embodiments of a coupled multi-core fiber.
Figure 8B:
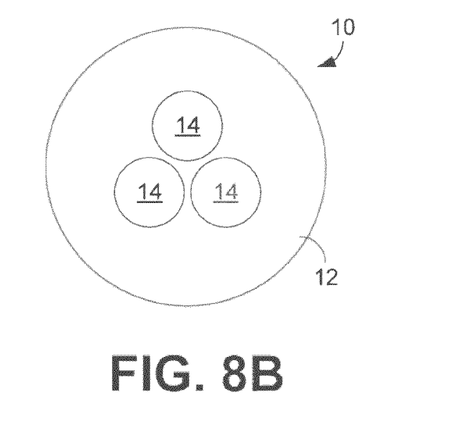
Figure 8C:
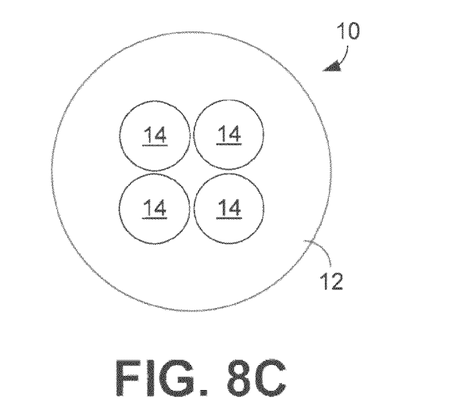
Figure 8D:
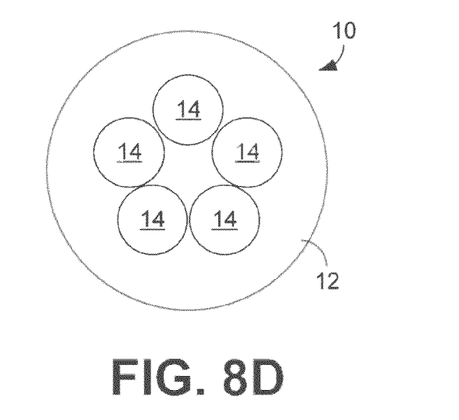
Figure 8E:
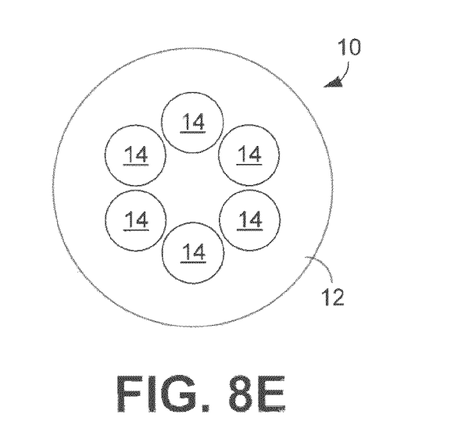
Figure 8F:
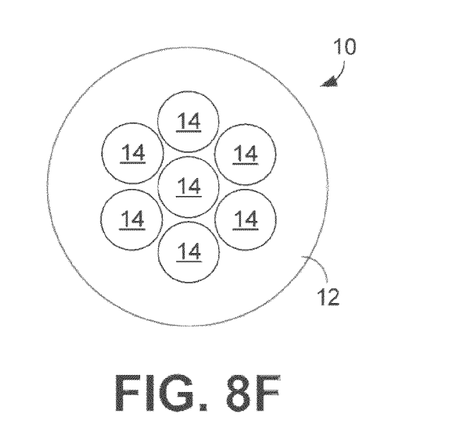
Figure 8G:
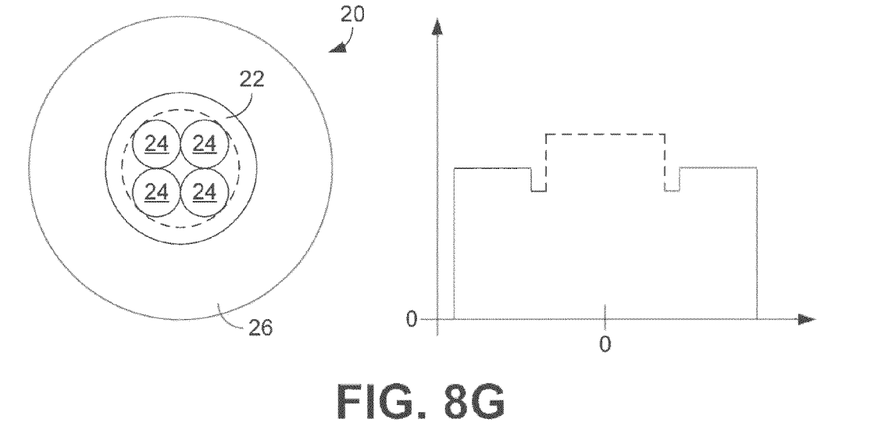
Figure 8H:
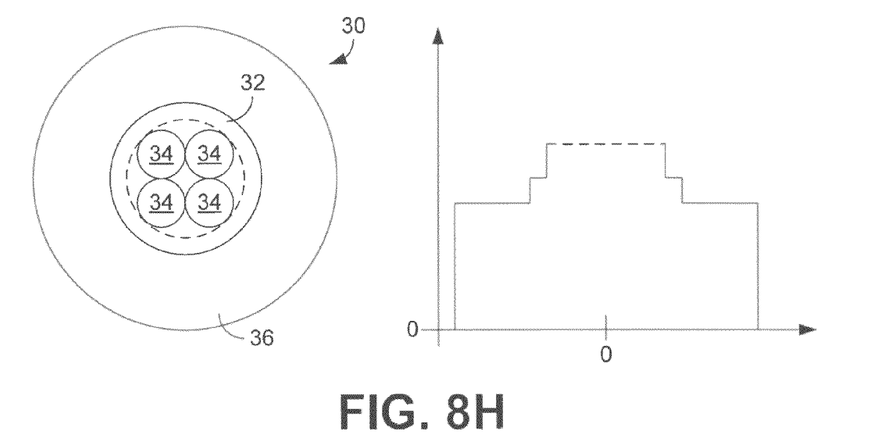
Figure 8I:
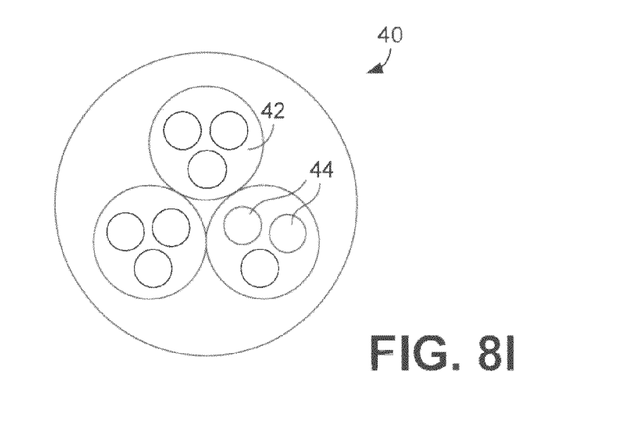

As shown in FIGS. 8G-I, a CMCF can include more than one cladding. In the embodiment of FIG. 8G, a CMCF 20 comprises an inner cladding 22 surrounding the cores 24 that has a lower index of refraction than an outer cladding 26. This depressed cladding structure may reduce bending loss. In the embodiment of FIG. 8H, a CMCF 30 has an inner cladding surrounding the cores 32 has a higher index of refraction than an outer cladding 34, which can further reduce DMGD for the supermodes. It is noted that the inner cladding can be used to adjust the coupling state between the cores without changing the pitch-to-core ratio. This might be useful for designing a CMCF 40 that has supermodes formed by core 42 that include multiple sub-cores 44, as is shown in FIG. 8I.

Although MCFs with close core spacing have been used in certain laser applications separate from optical communications, it is noted that those MCFs are active fibers that are doped with rare-earth elements to acquire gain. In contrast, the CMCFs described herein, such as those of FIG. 8, can be passive fibers that are not doped with rare-earth elements and that do not acquire gain.

Figure 9:
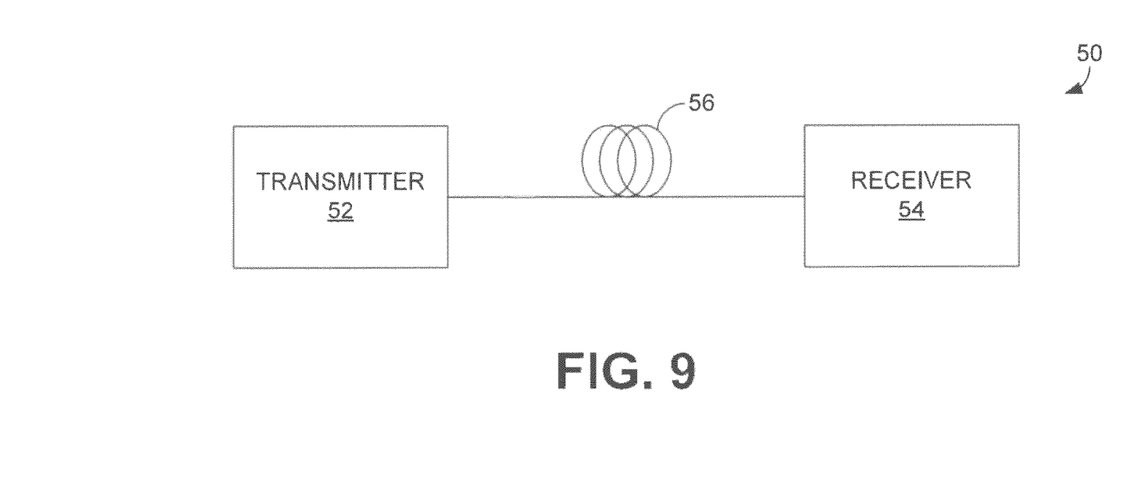
FIG. 9 is a block diagram of a first optical transmission system that incorporates coupled multi-mode fiber.

FIG. 9 illustrates a simple optical transmission system 50 that incorporates CMCFs. As is shown in that figure, the system 50 comprises a transmitter 52, a receiver 54, and a length of CMCF fiber 56. The transmitter 52 can comprise any transmitter that can transmit optical signals along the fiber 56 and the receiver 54 can comprise any receiver that can receive those transmitted signals. By way of example, the transmitter 52 comprises a laser with an external modulator and the receiver 54 at least comprises a photodetector.

Figure 10:
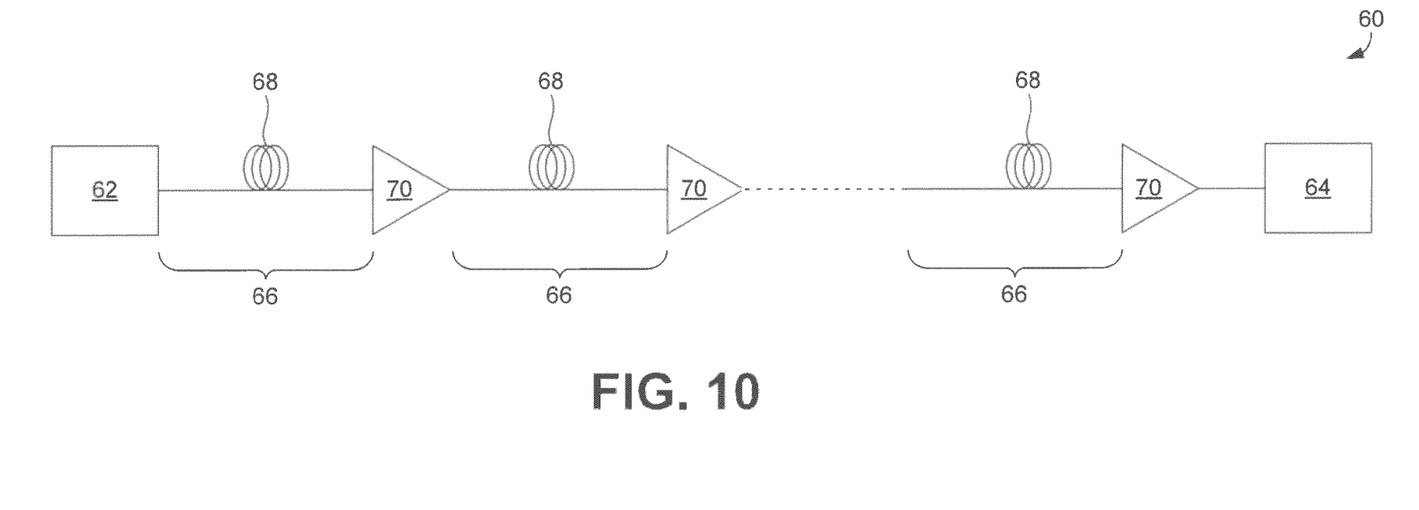
FIG. 10 is a block diagram of a second optical transmission system that incorporates coupled multi-mode fiber.

FIG. 10 illustrates a further optical transmission system 60, which can be used as a long-distance communication link. As is shown in FIG. 10, the system 60 also comprises a transmitter 62 and a receiver 64. In addition, the system 60 comprises multiple spans 66. One or more of the spans 66 comprises a length of CMCF 68. By way of example, each span 66 can be approximately 40 to 50 km in length for undersea applications and 80 to 100 km in length for terrestrial applications. The overall length of the communication link is potentially infinite but in many cases will extend across thousands of kilometers. Separating each span 66 along the length of the communication link between the transmitter 62 and the receiver 64 are optical amplifiers 70 that amplify the optical signals carried by the CMCFs 68. Although the system 60 has been described and illustrated as comprising an amplifier 70 at the end of each span 66, it is noted that other components, such as repeaters, could be used instead. It is noted that multiple communication links such as that illustrated in FIG. 10 can be connected in such a way to form networks.

Both systems 50 and 60 can be used to optically transmit data, for example across long distances. In some embodiments, this is performed by encoding data on an optical carrier, exciting a supermode of the CMCF with the data-encoded optical carrier, optically transmitting the supermode along the CMCF, and then receiving the transmitted signal using a receiver. When transmitting using SMO, only a single supermode, such as the fundamental supermode, can be excited. When transmitting data using MDM, multiple supermodes can be excited. In some embodiments, the number of data streams is the same as the number of supermodes. In other embodiments, the number of data streams is fewer than the number of supermodes.

Conclusion

Described herein are coupled multi-core fiber (CMCF) designs for long-haul transmission. The new designs exploit the coupling between the cores of multi-core fibers instead of avoiding it. The designs have advantages over the conventional multi-core fiber in terms of higher mode density and larger mode effective area. It is possible to avoid mode coupling between supermodes through additional degree of design freedom, which includes the pitch-to-core ratio and core arrangement. Although this disclosure has described with particularity four-core, six-core, and three-core structures due to their simplicity and symmetry, the number and arrangement of the cores can be modified to meet the requirements of the anticipated end use.

For single-mode operation, CMCFs can attain larger $\Delta N_{eff}$ and $A_{eff}$ than FMFs. As a result, CMCFs tend to have less mode coupling and nonlinearity, which is important for efficient long-haul transmission. The excitation of the fundamental supermode, as well as the higher-order supermodes, can be realized using free-space optics which have been used to excite spatial modes of FMFs. There is a possibility that supermode excitation is even simpler because supermodes can be seen as superpositions of modes of the coupled cores. The crosstalk accumulated in the higher-order supermodes after transmitting a certain distance could also be removed optically by using the phase reversal of higher order supermodes. For example, a 4f-configuration component can be used to remove the power of higher-order supermodes in the Fourier plane. In this disclosure, d/r was selected to be the minimum (d/r=2) to optimize both $\Delta N_{eff}$ and $A_{eff}$. However, it is noted that the value of d/r can be tuned to meet a specific individual requirement of a large $\Delta N_{eff}$ or $A_{eff}$.

For mode-division multiplexing, two concepts can be simultaneously applied in CMCFs. One is to utilize zero DMGD between the two degenerate supermodes and the other is to eliminate mode coupling between the non-degenerate supermodes. Demultiplexing can be realized by first detecting the non-degenerate supermodes separately and then recovering signals mixed in the degenerate supermodes using MIMO DSP techniques. Compared to FMF modes, the supermodes can maintain less mode coupling, nonlinearity, and similar loss. The other possibility is to design CMCFs with zero DMGD between all the supermodes and a DMGD slope small enough for WDM system. In this disclosure, a 60 ps/km DMGD between any two supermodes across the C-band has been demonstrated in a step-index three-core CMCF. This DMGD value can be further reduced by reducing the index difference between the core and cladding. It has been reported that graded-index profiles can decrease DMGD in FMFs. It is likely that a more sophisticated index profile including the graded-index profile for CMCFs may further reduce the DMGD.

The invention claimed is:

1. A passive, coupled multi-core fiber comprising:
multiple cores each supporting a spatial mode, the cores being positioned close enough to cause coupling between their modes that generates supermodes having an orthogonal mode distribution, where the supermodes are capable of transmitting data, the cores excluding a material that enables them to acquire gain, where the cores are multi-mode cores that support multiple spatial modes; and
an outer cladding surrounding the cores.

2. The passive, coupled multi-core fiber of claim 1, wherein the fiber has a pitch-to-core ratio of approximately 2 to 10.

3. The passive, coupled multi-core fiber of claim 2, wherein each core and the cladding have an index difference of approximately 0.4%.

4. The passive, coupled multi-core fiber of claim 1, wherein the fiber has a coupling length less than 7 km.

5. The passive, coupled multi-core fiber of claim 1, wherein the fiber has a coupling coefficient larger than 0.2 km$^{-1}$.

6. The passive, coupled multi-core fiber of claim 1, wherein the fiber has a crosstalk larger than −30 dB/km.

7. The passive, coupled multi-core fiber of claim 1, wherein the multi-mode cores are few-mode cores that support no more than seven spatial modes.

8. The passive, coupled multi-core fiber of claim 1, wherein at least one of the cores has an index of refraction that radially varies.

9. The passive, coupled multi-core fiber of claim 1, wherein the fiber comprises an inner cladding that is surrounded by the outer cladding, the inner cladding having an index of refraction that is different from the index of refraction of the outer cladding.

10. An optical transmission system, comprising:
one or both of a transmitter and a receiver; and
a coupled multi-core fiber including multiple cores each supporting a spatial mode, the cores being positioned close enough to cause coupling between their modes that generates supermodes having an orthogonal mode distribution that are available for transmitting data over the system, where the cores are multi-mode cores that support multiple spatial modes.

11. The optical transmission system of claim 10, wherein the coupled multi-core fiber has a pitch-to-core ratio of approximately 2 to 10.

12. The optical transmission system of claim 10, wherein each core and cladding have an index difference of approximately 0.4%.

13. The optical transmission system of claim 10, wherein the coupled multi-core fiber has a coupling length less than 7 km.

14. The optical transmission system of claim 10, wherein the coupled multi-core fiber has a coupling coefficient larger than 0.2 km$^{-1}$.

15. The optical transmission system of claim 10, wherein the coupled multi-core fiber has a crosstalk larger than −30 dB/km.

16. The optical transmission system of claim 10, wherein the multi-mode cores are few-mode cores that support no more than seven spatial modes.

17. A method of transmitting data using coupled multi-core fiber, where the cores of the coupled multi-core fiber are multi-mode cores, the method comprising:
encoding data to be transmitted on an optical carrier;
exciting a supermode of the coupled multi-core fiber with a data-encoded optical carrier, the supermode being generated due to mode coupling between the cores of the coupled multi-core fiber, the supermode having an othrogonal mode distribution; and
optically transmitting the supermode along the coupled multi-core fiber.

18. The method of claim 17, wherein the coupled multi-core fiber supports multiple supermodes but only one supermode is excited so as to transmit data in a single-mode operation scheme.

19. The method of claim 18, wherein the excited supermode is the fundamental supermode of the coupled multi-core fiber.

20. The method of claim 17, wherein the coupled multi-core fiber supports multiple supermodes and multiple supermodes are excited so as to transmit data in mode-division multiplexing scheme.

* * * * *